Patented Oct. 26, 1943

2,332,825

UNITED STATES PATENT OFFICE 2,332,825

LUBRICANT

John C. Zimmer, Union, and Arnold J. Morway, Clark Township, Union County, N. J., assignors, by mesne assignments, to Jasco, Incorporated, a corporation of Louisiana No Drawing. Application October 21, 1941, Serial No. 415,870

7 Claims. (Cl. 252—36)

The present invention relates to an improved grease composition particularly adapted for use in mechanical devices such as air brake drums which have rubber fittings such as rubber bushings and rubber gaskets.

Air brake equipment is used on all railroad rolling stock and locomotives and on many buses and trucks. These types of service require long and hard usage in all kinds of atmospheric conditions with only infrequent layovers for cleaning, oiling and repairs. Since efficient brake equipment is essential to the safe and dependable operation of such transportation facilities, an air brake lubricant is required which will provide adequate lubrication under all conditions and over a long period of time. Broadly speaking a grease is a dispersion or solution of a metallic soap in a mineral lubricating oil. The oil functions as the lubricant and the soap to keep the oil in a semi-fluid condition. In the problem at hand, that of furnishing an efficient air brake lubricant, it is necessary to provide an oil of sufficiently low pour point that it will not congeal at the lowest normal atmospheric temperatures encountered; of sufficiently low temperature coefficient that it will not lose its lubricating qualities when subjected to high atmospheric temperatures and an oil which will not swell or soften rubber and a soap which will retain the oil in a semi-fluid state under all of these atmospheric conditions.

It is an object of this invention to provide a lubricant possessing marked superiority in the characteristics above enumerated. Other and further objects will be apparent to those skilled in the art upon reading the following description.

In general, the improved grease composition of this invention comprises a saturated fatty acid soap of an alkaline earth metal homogeneously dispersed in a highly refined, substantially aromatic-free mineral lubricating oil having dissolved therein an oil-soluble linear olefinic polymer of from 6000 to 15,000 molecular weight.

Although a wide range of low pour point lubricating oils may be employed as the lubricant in the grease, it is preferred to use a low pour point substantially aromatic-free Coastal lubricating oil distillate having an A. P. I. gravity of from 26 to 28, flash 350° to 450° F., V. I. 60 to 70 and a pour point below −25° F. An oil of this character has a sufficiently low pour point to insure adequate lubrication at low atmospheric temperatures, however it possesses a relatively high temperature coefficient and it is necessary to add a V. I. improver in order to provide adequate lubrication at high atmospheric temperatures. As V. I. improvers it has now been discovered that oil-soluble linear olefinic polymers, such as the linear polymers of isobutylene of from 6000 to 15,000 molecular weight give very satisfactory temperature coefficient characteristics to the oil without unduly increasing the viscosity and pour point of the oil. It is preferred to use from 5 to 20% of the polymer based upon the quantity of the oil. 10% or 5 grams of polymer of about 12,000 molecular weight dissolved in 45 grams of aromatic-free Coastal lubricating oil of 27 A. P. I. gravity, flash 370° F., V. I. 65 and a pour of −25° F. resulted in a blend possessing the following inspections: A. P. I. gravity 27.2, flash 350° F., viscosity at 100, 535, viscosity at 210, 72, V. I. 113 and pour point −25° F. Previously attempts to incorporate a linear olefinic polymer of less than 20,000 molecular weight in a grease have met with failure, resulting only in a mixture of soap curd floating in oil. An anti-oxidant such as phenyl alpha naphthylamine or a mixture of phenyl alpha naphthylamine and zinc naphthenate may be included in the grease if desired.

For the production of soaps it is preferred to use as a soap stock a high molecular weight saturated fatty acid such as stearic acid or the acids derived from hydrogenated fish oil or the corresponding fats. Sufficient of the soap stock should be used to provide from 15 to 30% of soap in the finished grease. The soaps of the alkaline earth metals such as calcium, strontium, and barium have been found to be admirably suited to the purposes of this invention.

In making the grease the preferred method is to dissolve the soap stock in a portion of the lubricating oil by means of heating and stirring, which can usually be accomplished at temperatures between 110° and 160° F. The alkaline earth metal in the form of its hydrated oxide is used to form a slurry with the remainder of the lubricating oil. If the addition of an anti-oxidant is desired a small amount, approximately 5%, of the lubricating oil is reserved for this purpose. The slurry of alkaline earth metal hydroxide and oil is then slowly added to the solution of soap stock and oil and the mixture heated and stirred for 20 to 30 minutes at a temperature of from 110° to 130° F. preferably not over 110° F. After the slurry has been thoroughly incorporated, the anti-oxidant and polymer dissolved in the remainder of the oil is then thoroughly mixed in the grease removed from the mixing apparatus. The following example will serve to illustrate typical compositions according to this invention.

Example

|  | Percent |
|---|---|
| Hydrogenated fish oil acids | 18.0 |
| Hydrated lime | 2.64 |
| Low pour point Coastal lubricating oil | 70.5 |
| Oil-soluble linear olefinic polymer of from 10,000 to 12,000 molecular weight | 7.85 |
| Zinc naphthenate | 0.5 |
| Phenyl alpha naphthylamine | 0.5 |

The hydrogenated fish oil acids and about half of the lubricating oil were added to a steam jacketed kettle equipped with agitators and the temperature raised to melt the acid and then adjusted to 110° F. The mixture was stirred until the acids had all dissolved in the oil. The hydrated lime was separately mixed with all but a small amount of the remaining lubricating oil to form a slurry which was added to the steam jacketed kettle, the temperature was maintained at 110° F. and the mixture stirred for 20 minutes. (If the temperature increases above 110/120° F. some softening of the grease is noted.) The zinc naphthenate, phenyl alpha naphthylamine and polymer dissolved in the remainder of the oil was then thoroughly mixed into the grease. The product was then removed from the kettle and placed in containers.

What is claimed is:

1. A grease composition comprising an aromatic-free Coastal mineral lubricating oil, from 15 to 30% of a saturated fatty acid soap of an alkaline earth metal and an oil-soluble linear olefinic polymer having a molecular weight between 6000 and 15,000.

2. A grease composition comprising from 56% to 81.5% of an aromatic free Coastal mineral lubricating oil, from 15% to 30% of a saturated fatty acid soap of an alkaline earth metal and from 3.5% to 17% of an oil-soluble linear olefinic polymer having a molecular weight between 6000 and 15,000.

3. A composition as defined in claim 2 in which the aromatic-free Coastal mineral lubricating oil is an oil having an A. P. I. gravity of from 26 to 28, flash 350° to 450° F., V. I. 60 to 70 and a pour point below —25° F.

4. A grease composition as defined in claim 2 in which the saturated fatty acid soap of an alkaline earth metal is calcium stearate.

5. A grease composition as defined in claim 2 in which the saturated fatty acid soap of an alkaline earth soap is the calcium soap of hydrogenated fish oil acids.

6. A grease composition as defined in claim 2 in which the oil-soluble linear olefinic polymer has a molecular weight of about 12,000.

7. A grease composition consisting of 70.5% of an aromatic-free, low pour Coastal mineral lubricating oil; 20.64% calcium soap of hydrogenated fish oil acids; 7.85% oil-soluble linear isobutylene polymer of about 12,000 molecular weight, 0.5% zinc naphthenate and 0.5% phenyl alpha naphthylamine.

JOHN C. ZIMMER.
ARNOLD J. MORWAY.